G. S. NOBLE.
MIXER.
APPLICATION FILED OCT. 2, 1905.
1,053,741.
Patented Feb. 18, 1913.
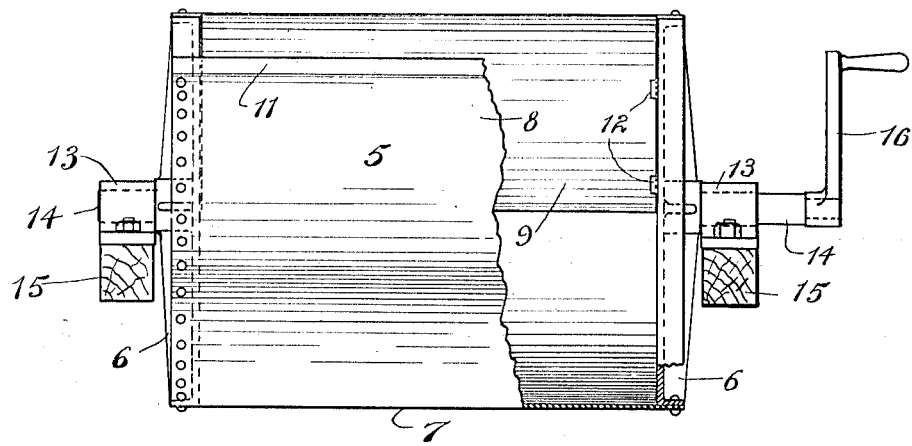
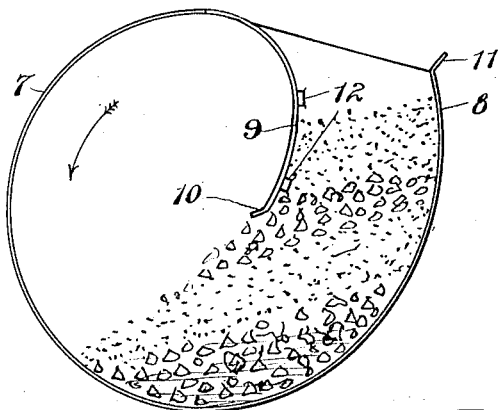
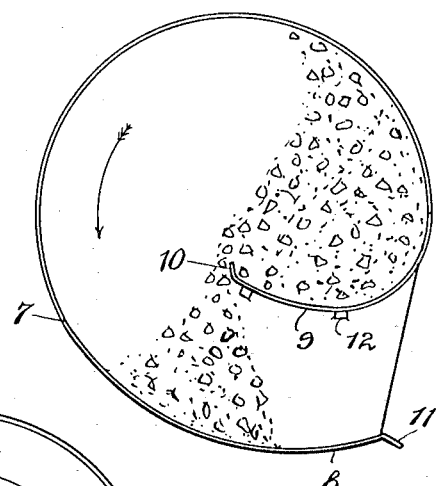
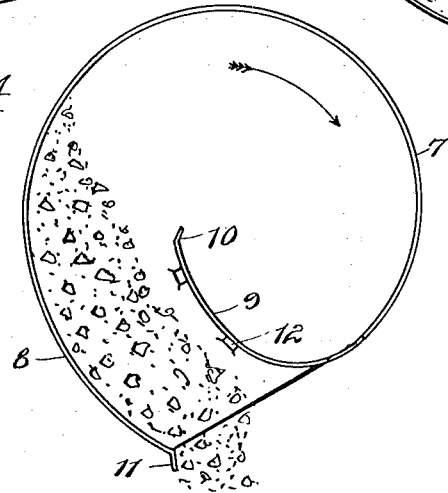
Witnesses:
B.C. Bean
C. Heymann
Inventor,
Glenn S. Noble.

UNITED STATES PATENT OFFICE.

GLENN S. NOBLE, OF CHICAGO, ILLINOIS.

MIXER.

1,053,741.  Specification of Letters Patent.  Patented Feb. 18, 1913.

Application filed October 2, 1905. Serial No. 280,871.

*To all whom it may concern:*

Be it known that I, GLENN S. NOBLE, a citizen of the United States, and resident of Chicago, in the county of Cook and State of Illinois, have invented certain new and useful Improvements in Mixers, of which the following is a specification.

This invention relates more particularly to mixing machines or devices adapted to mix concrete, mortar or other material. Its objects are to provide such an apparatus that will be simple in construction, that will have no parts liable to be rapidly worn, and which will be rapid and effective in producing a thorough mixture of the aggregates or materials to be mixed.

In the accompanying drawings illustrating this invention, Figure 1 is a side elevation with the drum partly broken away to show the interior construction. Figs. 2, 3, and 4 are end views shown with one of the heads removed, to illustrate the method of feeding, mixing, and discharging, respectively.

As shown in the drawings, 5 represents a mixing drum embodying this invention. The drum comprises the outwardly flanged heads 6, 6 to which is secured the sheet metal portion 7 which forms the sides and interior part of the drum. The periphery or longitudinal portion of the drum is formed, with overlapping edges 8 and 9 so that the cross section is of a substantially spiral form. The inner overlapping portion or edge 9 may terminate with an inturned edge 10 to prevent the material from being discharged from within this inner area of the drum too quickly. The outer overlapping portion 8 preferably terminates with an outwardly turned edge 11 for convenience in dumping the material. The heads 6, 6, are preferably outwardly flanged as shown in Fig. 1 so that no rivet heads are present within the interior or mixing part of the drum. These heads are shaped, as shown in Figs. 2, 3, and 4 and follow the outer periphery of the drum, but it will be apparent that the heads may be otherwise formed and arranged if desired. The inner overlapping part 9 is bent inside of these heads, and is held in position by means of lugs 12, which prevent the load, as shown in Fig. 3, from springing the part 9 down or out. This drum may be mounted in any desired manner, but for convenience I have simply shown end bearings 13 for the trunnions 14, and have shown such bearings mounted on beams 15, the latter being intended to represent any desired form of support or frame. The mixing drum may likewise be driven in any desired manner, that is by means of an engine or the like, or might be driven by hand power, and as an illustrated means of showing how the drum may be turned, I have provided the crank 16 on the end of one of the trunnions 14.

The operation of the mixer will be readily understood from the last three figures. In Fig. 2, the material is shown as having been dumped into the side of the drum through the opening between the overlapping sides 8 and 9. In mixing concrete, this material might consist of stone, sand, and cement and sufficient water added thereto, to give the proper consistency to the concrete. The material as thus dumped into the drum from wheelbarrows or other feeding devices, would be probably more or less in layers as illustrated in this figure. The drum having thus been loaded is turned in the direction indicated by the arrow and the material slides around and rolls over itself until it is gathered into the inner area of the drum as shown in Fig. 3. A continued revolution causes the material to fall over the edge 10 on to the outer overlapping portion 8, and this falling rapidly causes the material to be thoroughly mixed and the stone to be coated with the cement. A further revolution again causes the material to roll or fall back into the inner portion of the drum and the process may be continued until the aggregates are thoroughly mixed. When this occurs, the drum is turned in the opposite direction as shown in Fig. 4 and the material will slide out through the opening between the overlapping portions as shown.

On account of the interior of the drum being substantially free from obstructions, there is comparatively little tendency for the material to stick to the drum or to clog the same. Furthermore, the drum may be easily cleaned, this being done by pouring water therein and turning it in the direction for mixing, and, if desired, comparatively large pieces of stone or bricks or the like may be put in the water, which will hasten the cleaning action.

Having thus described my invention, which I do not wish to limit to the exact de- tails of construction herein set forth, what I claim and desire to secure by Letters Patent is:

1. In a mixing apparatus, a frame and a reversible rotatable drum mounted thereon, the drum consisting of an imperforate peripheral section or wall curved to form a single involute with but a single throat-like charging and discharging passage between the in-turned end-portion and the out-turned end-portion, and an imperforate head attached to each end of the drum to close the same, each head carrying a central stub-shaft journaled in the frame.

2. A drum for a mixing machine, comprising an imperforate plate curved in a substantially spiral form as shown herein, the overlapping ends of the spiral plate forming a single charging and discharging passage, and heads for closing the ends of the drum.

3. A drum for a mixing machine, comprising an imperforate plate bent in an approximately cylindrical form but having the ends of the plate offset to form a single passage along the side of the drum, the inner end of the plate extending inwardly toward the center of the drum, and heads at the ends of the plate.

GLENN S. NOBLE.

Witnesses:
B. C. BEAN,
C. HEYMANN.